June 14, 1960 G. K. NEWELL ET AL 2,940,553
RAILWAY WHEEL TREAD BRAKE UNIT
Filed July 24, 1958 2 Sheets-Sheet 2

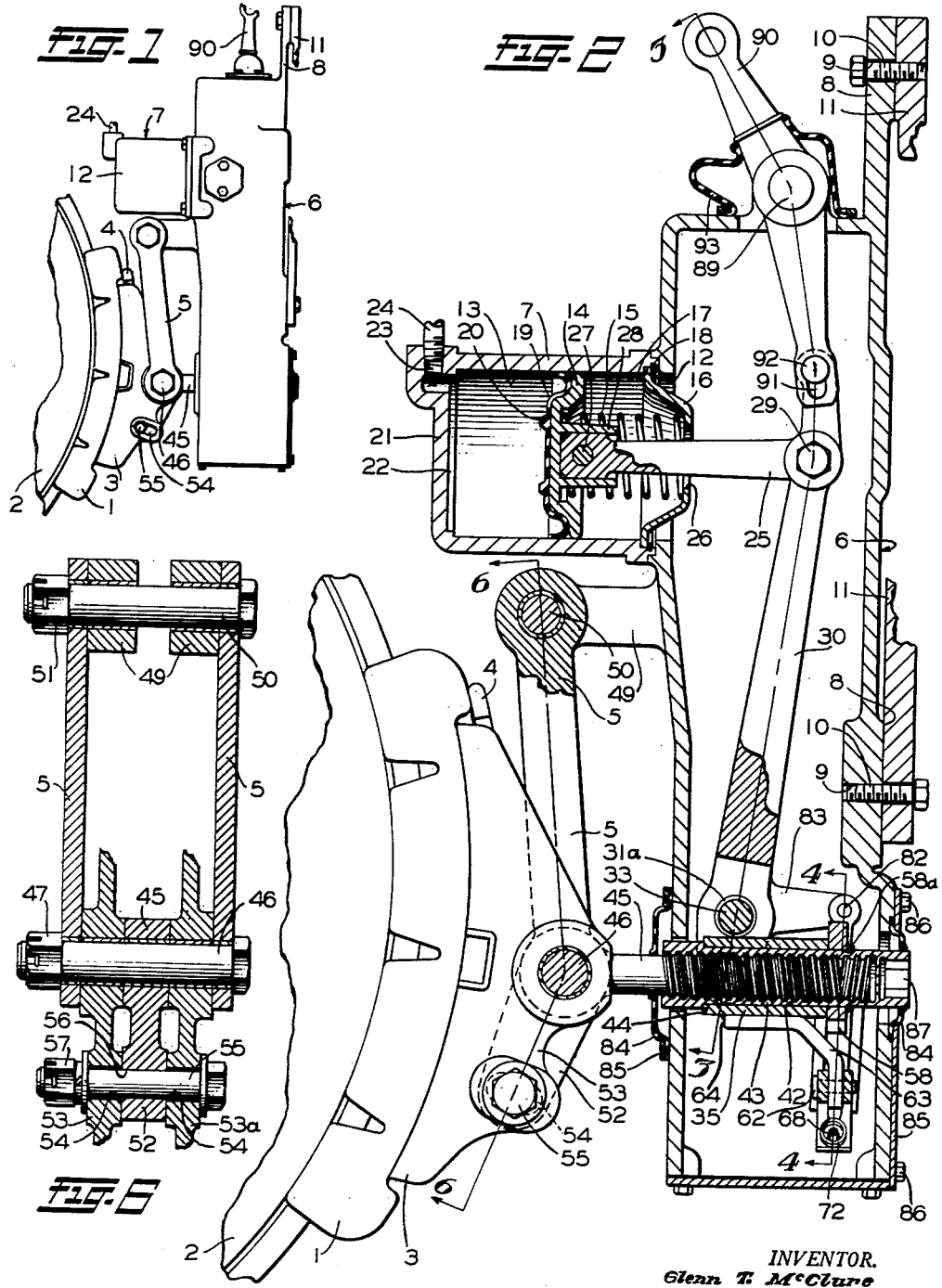

INVENTOR.
Glenn T. McClure
Thomas F. Hursen
BY George K. Newell
Adelbert A. Steinmeier
Attorney

United States Patent Office 2,940,553
Patented June 14, 1960

2,940,553

RAILWAY WHEEL TREAD BRAKE UNIT

George K. Newell, Trafford, Glenn T. McClure, McKeesport, and Thomas F. Hursen, Monroeville, Pa., assignors to Westinghouse Air Brake Company, Wilmerding, Pa., a corporation of Pennsylvania Filed July 24, 1958, Ser. No. 750,704

7 Claims. (Cl. 188—153)

This invention relates to tread brake apparatus for railway rolling stock and more particularly to so-called "package" brake units wherein most of the actuating mechanism is enclosed in a unitary sectionalized casing or "package" to protect it against dirt, ice and water.

One of the present day conventional brake riggings for railway cars consists of one or more brake cylinders carried on the underside of the car body and having the piston rods thereof connected through rods and levers to the brake shoes, independently hung on brake shoe hangers from the truck frame, to effect movement of all of the brake shoes on the car into and out of engagement with the tread of the car truck wheels.

The conventional type of brake rigging cannot conveniently be employed on the new type of lightweight cars due to limitations of space and weight requirements.

It is accordingly the principal object of the present invention to provide a small, lightweight, compact, independently operated pneumatic brake unit for each individual wheel of a railway car truck.

In the accompanying drawings:

Fig. 1 is a side elevational view of a brake unit embodying the invention, showing the manner by which the unit is mounted on a railway passenger car truck.

Fig. 2 is a vertical cross-sectional view of the brake unit of Fig. 1 showing the brake applying linkage and slack adjuster mechanism.

Fig. 6 is a cross-sectional view, taken on the line 6—6 of Fig. 2 and looking in the direction of the arrows, showing further structural details.

Description

Figure 5:
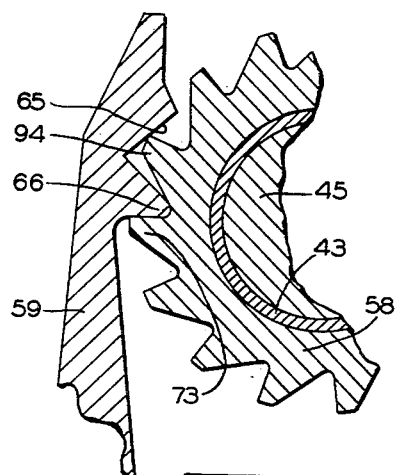
Fig. 5 is a fragmentary enlarged sectional view, showing certain details of the pawl and ratchet wheel of Fig. 4.

As shown in Fig. 1 of the drawings, a pneumatic brake unit, one of which is provided for each wheel of a railway passenger car truck, is secured, as by several bolts and nuts to a pair of bosses formed integral with the center sill of the truck frame.

As shown in detail in Fig. 2, the brake unit comprises a brake shoe 1 for movement into braking contact with the tread of a wheel 2 of the car truck, a brake head 3 to which the brake shoe 1 is secured, as by a key 4, an external brake head hanger 5, and a sectionalized casing comprising a main section 6 and a brake cylinder section 7.

Formed integral with the main casing section 6 is a pair or bosses 8 provided with several spaced-apart bores 9 for receiving a like number of cap screws 10 whereby the main section 6 is rigidly secured to a pair of angle brackets 11 attached, as by welding, to a center sill (not shown) of a passenger car truck frame.

The brake cylinder casing section 7 is cylindrical in form and separably secured, as by cap screws (not shown) to one side of the main section 6, in registry with an opening 12 in the side wall of the main casing section 6. Slidably operable in a bore 13 in the casing section 7 is a fluid pressure actuated brake applying piston 14.

A release spring 15 is interposed between the piston 14 and a disc-shaped non-pressure head 16 that is secured in a counterbore 17 at the inner end of the casing section 7 as by a snap ring 18, and serves to yieldingly bias the piston 14 and, through a linkage to be hereinafter described, the brake shoe 1 in a brake releasing direction from the brake applied position, in which they are respectively shown in Fig. 2, to a brake release position thereof as indicated in Fig. 1.

A packing cup 19 of the snap-on type is secured to the pressure face of piston 14, and has several lugs 20 thereon which, when piston 14 occupies its brake release position, contact the closed end of pressure head 21 of casing section 7. A pressure chamber 22 is thus formed between the pressure head 21 and piston 14 to which fluid under pressure may be supplied through a port 23 and a pipe 24. Pipe 24 may be connected to the brake cylinder pipe of a brake control valve of the usual air brake system on railway passenger cars.

Figure 3:
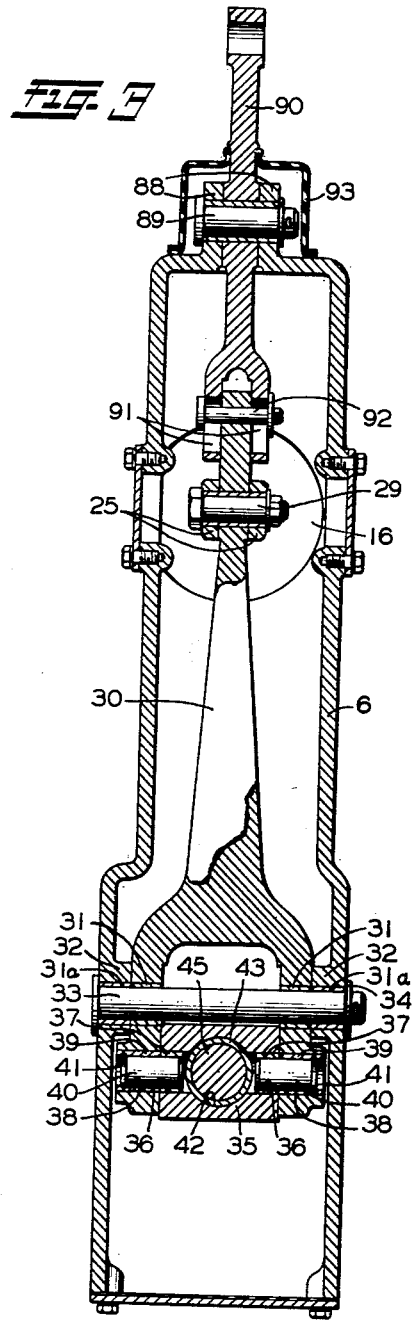
Fig. 3 is a cross-sectional view, taken along the line 3—3 of the brake unit of Fig. 2 and looking in the direction of the arrows, showing further structural details.

A piston rod 25 that extends through an opening 26 in the non-pressure head 16 into the chamber formed inside the main casing section 6, is pivotally connected at one end, as by a pin 27, to a central boss or sleeve 28 formed at one side of and integral with the piston 14, and at the other end, as by a pin 29, to a brake lever 30 adjacent one end of the lever. The brake lever 30 is bifurcated adjacent its opposite end (see Fig. 3) and the bifurcations are provided with coaxial bores into which is press-fitted a pair of sleeve-type bearings 31. A similar pair of bearings 31a are carried in a pair of oppositely arranged and inwardly facing bosses 32 formed on the opposite walls of the main casing section 6. A pin 33 having a head at one end and a snap ring 34 adjacent the other, extends through the bearings 31, 31a to permit rocking of lever 30 about the pin 33.

Disposed between the bifurcations of the brake lever 30 is a rectangular member 35 which has a through bore 36 (see Fig. 3) the outer ends of which each contain a short bushing 37. Each of the bifurcations is provided with a bore 38 coaxial with and having the same diameter as the bore 36. Each of the bores 38 contains a bushing 39 of the same inner and outer diameters as the bushings 37. The member 35 is pivotally connected to the brake lever 30 by a pair of pins 40 that extend respectively into coaxial adjacent bushings 37 and 39. Outward shifting of the pins 40 in their respective sets of bushings is limited by a snap ring 41 which is disposed in a cooperating groove formed on the inside of the respective bushings 39.

The member 35 is provided with a second bore 42, the axis of which intersects at right angles the axis of the bore 36. Disposed in the bore 42 with a turning fit is an internally threaded sleeve member 43 having adjacent its left-hand end, as seen in Fig. 2, a shoulder 44 against which abuts the left-hand end of member 35.

A brake rod 45 threaded at one end, has screw-threaded engagement with the internally threaded sleeve member 43, and at the other end is pivotally connected to one end of the brake head hanger 5 and the brake head 3, as by a bolt 46 and a nut 47. The brake hanger 5 comprises two identical parallel links suspended respectively from a pair of spaced brackets 49 integral with the main casing section 6, as by means of a bolt 50. Suitable anti-friction bushings are disposed, as shown in Fig. 6, in a bore in each of the links and brackets for receiving bolt 50. A nut 51 secures the bolt 50 against removal from the position in which it is shown in Fig. 6.

The above-mentioned other end of the brake rod 45 is provided with an angular arm piece 52 formed integral with the brake rod and disposed between two spaced brackets or flanges 53 and 53a formed on and at the back of the brake head 3. Each of the brackets 53 and 53a is provided with a guide slot 54. A bolt 55 extends through the slots 54 in the brackets 53 and 53a and a bore 56 in the angular arm piece 52 and is secured in place by a nut 57. The slots 54 serve to limit the angular rotation of the brake head 3 about the bolt 46 as the brake shoe 1 is actuated into and out of contact with the tread of the wheel 2 in response to operation of the brake linkage comprising piston 14, piston rod 25, brake lever 30, and brake rod 45. By thus limiting the angular rotation of the brake head 3, the upper end of the brake shoe 1 is prevented from contacting or dragging on the tread of the wheel 2 when the brake application is released.

It is apparent from Fig. 2 that, as the braking surface of the brake shoe 1 wears away, the travel of the brake rod 45 in the direction of the left hand will increase upon each successive application of the brakes. Therefore, in order to maintain the same travel distance for the brake rod 45 and also the piston 14, upon each subsequent application of the brakes as the brake shoe 1 wears away, the brake unit is provided with a slack take-up or adjuster mechanism which will now be described in detail.

The slack adjuster mechanism of the brake unit shown in Figs. 1 and 2 comprises, in addition to the threaded portion of brake rod 45, and the internally threaded sleeve member 43 which has screw-threaded engagement with the threaded portion of the brake rod 45, a ratchet wheel 58, a pawl 59, and a driving mechanism operatively connecting the pawl 59 to the brake lever 30.

The ratchet wheel 58 is press-fitted to the sleeve member 43 with the left side thereof in abutting contact with the right-hand end of the member 35 and is retained in this position by a snap ring 58a.

Figure 4:
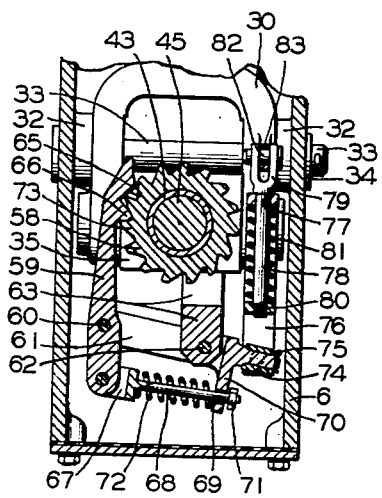
Fig. 4 is a cross-sectional view, taken along the line 4—4 of Fig. 2 and looking in the direction of the arrows, showing further details of the slack adjuster mechanism.

The pawl 59, as shown in Fig. 4, is pivotally mounted intermediate its ends, as by a pin 60, adjacent a bifurcated end of a slack adjuster lever 61 which in turn is pivotally mounted, as by means of a pin 62, intermediate its ends adjacent one end of an angle bracket 63, the opposite end of which is welded to the rectangular member 35 at 64 (Fig. 2). As shown in Fig. 5, one end of the pawl 59 is provided with a cam surface 65 and a pawl tip 66. The opposite end of the pawl 59 is connected to a clevis 67 (Fig. 4) at one end of a slack adjuster pawl return link 68. The opposite end of pawl return link 68 extends with clearance through a bore 69 in an arm 70 integral with the slack adjuster lever 61 and is screw-threaded to receive a nut 71. Surrounding the pawl return link 68 and disposed between the arm 70 and the clevis 69 is a spring 72 for biasing the pawl 59 in a direction in which the pawl tip 66 thereof is in engagement with a tooth 73 on the ratchet wheel 58.

The end of the slack adjuster lever 61 opposite the bifurcated end is cylindrical and extends through a bore in a trunnion 74. The trunnion 74 is retained on the cylindrical end of the lever 61 by a cotter pin 75.

The trunnion 74 is operatively connected to the open end of a U-shaped slack adjuster link 76. The opposite end of the link 76 is provided with a bore 77 through which passes a pull link 78 threaded at one end and having a clevis 79 at the opposite end. A nut 80 is secured by screw-threaded engagement to the threaded end of the pull link 78. A spring 81 is disposed between the nut 80 and the slack adjuster link 76 to provide a resilient connection between the slack adjuster link 76 and the pull link 78.

The clevis 79 of the pull link 78 is operatively connected, as by a pin 82, to an arm 83 that is formed integral with the brake lever 30.

As shown in Fig. 2, the opposite ends of the sleeve member 43 extend through suitable openings in opposite walls of the main casing section 6 to the exterior thereof. In order to prevent the entrance of water, ice and dirt to the interior of casing section 6, a rubber boot 84 surrounds each opening and is retained in place by an annular plate 85 which is secured to the casing section 6 by several cap screws 86.

The sleeve member 43 may be provided adjacent the right-hand end thereof with a splined socket 87 to receive a socket wrench so that the sleeve member can be manually rotated to let out slack prior to replacing a worn brake shoe.

In order to provide in customary fashion for operation of the brakes by hand brake means, a pair of parallel spaced-apart lugs 88 (Fig. 3) are formed integral with the casing section 6 on the top end thereof, and disposed therebetween and pivotally connected thereto intermediate its ends, as by a pin 89, is a hand brake lever 90. The lower end of the lever 90 is bifurcated and provided with a slot 91 to permit the lever 90 to be operatively connected to the brake lever 30, as by a pin 92, which extends through a bore adjacent the upper end of the brake lever 30 and the slot 91. The upper end of the hand brake lever 90 may be connected as through a cable and a system of pulleys (not shown) to the hand brake wheel which is located at one end of a railway car. A rubber boot 93 surrounds the lever 90 and the lugs 88 to prevent the entrance of foreign matter into the interior of the casing section 6 through the opening formed between the lugs 88.

Operation

Let it be assumed that the chamber 22 of the brake cylinder casing section 7 is devoid of fluid under pressure and that the spring 15 has moved the piston 14 in the direction of the left hand from the position in which it is shown in Fig. 2 to a position in which the lugs 20 on the packing cup 19 contact the pressure head 21. The piston 14, as it is moved in the direction of the left hand by the spring 15, effects, through piston rod 25, counterclockwise rocking of brake lever 30 to move the brake head 3 and brake shoe 1 away from the wheel 2 to a brake release position in which they are shown in Fig. 1.

In operation, when it is desired to effect a brake application, fluid under pressure is admitted to the pressure chamber 22 through the pipe 24 which is connected to the brake controlling valve device of the usual air brake system on railway passenger cars. Fluid under pressure thus supplied to the chamber 22 formed between the piston 14 and the pressure head 21 is effective to move the piston 14 and piston rod 25 in the direction of the right hand under the yielding resistance of spring 15. As the piston 14 and rod 25 are moved in the direction of the right hand, the brake lever 30 is rocked clockwise, via the bearings 31, on the pin 33. Since the brake lever 30 is pivotally connected to the rectangular member 35 by means of the pins 40, and the sleeve 43 and brake rod 45 are carried by member 35, clockwise rocking of brake lever 30 is effective to move the brake rod 45 in the direction of the left hand to bring the brake shoe 1 carried by the brake head 3 into braking contact with the wheel 2 to effect a braking action on the wheel 2.

As the brake head 3 and brake shoe 1 are moved as described above, these members are supported and guided by the hanger 5 as this hanger is rocked about the bolt 50 carried by the brackets 49. The orientation of the hanger 5, the brake head 3, and brake rod 45 is such that the brake head 3 and brake shoe 1 carried thereby are moved radially toward the wheel 2.

When it is desired to release the brake application, the fluid under pressure supplied to chamber 22 is vented in the usual manner to atmosphere through the pipe 24 to the brake controlling valve device of the car brake system, whereupon the force of spring 15 acting on the non-pressure head 16 moves the piston 14 and piston rod 15 in a brake releasing direction to effect counterclockwise rocking of brake lever 30 and movement of the brake head 3 and brake shoe 1 correspondingly away from the tread surface of the wheel 2 to effect a brake release.

In operation, when the brake lever 30 is rocked in a clockwise direction in order to effect an application of the brakes, as explained above, the arm 83 is moved in the same direction (as viewed in Fig. 2).

At the same time, the slack adjuster lever 61, through the intermediary of trunnion 74, slack adjuster link 76, spring 81, pull link 78, pin 82, and arm 83 (Fig. 4), is rocked clockwise about pin 62 to move the pawl 59 carried by the lever 61 on the pin 60 in an upward direction so that the pawl tip 66 slides upward on the back of a tooth on the ratchet wheel 58, which ratchet wheel remains stationary under these conditions by reason of the fact that it is press-fitted to the sleeve member 43 which is carried by the rectangular member 35 at this time being moved in the direction of the left hand by the brake lever 30. If the brake shoe wear does not exceed a predetermined amount, the pawl tip 66 will not be moved upward along the back of the tooth a sufficient distance to engage with the next tooth on the ratchet wheel 58. Consequently, when the brakes are subsequently released under these conditions, the pawl 59 returns to its original position without effecting rotation of the ratchet wheel 58 since the spring 72 is effective to bias the pawl 59 in a clockwise direction about the pin 60 to maintain the pawl tip 66 in engagement with the back of the same tooth along with the pawl tip slides during a brake application.

If, however, during a brake application, the brake shoe 2 wears away sufficiently for the pawl tip 66 to be moved upward until it reaches the end of the back of a tooth on the ratchet wheel 58, it will engage the next tooth on the ratchet wheel as shown in Figs. 4 and 5. With the pawl tip 66 now in engagement with the next tooth on the ratchet wheel 58, as shown in Fig. 4, the pawl 59 will be effective to rotate the ratchet wheel and the sleeve member 43 upon a subsequent release of the brakes. Rotation of brake rod 45 is prevented by its connection to the brake head 3 and hanger 5. Consequently, the screw-threaded sleeve member 43 is unscrewed from the screw-threaded portion of brake rod 45, thus moving the brake shoe 1 in the direction of the wheel 2 and taking up the slack occurring as a result of the wearing away of the brake shoe 1.

From the above, it is apparent that as the brake shoe 1 wears away, the brake rod 45, and consequently the brake shoe 1, are moved radially in the direction of the wheel 2 to always maintain a substantially uniform clearance between the tread of the wheel 2 and the braking surface of the brake shoe 1 when the brake shoe occupies its brake release position.

When the brake shoe 1 has completely worn out and it is replaced with a new shoe, it is necessary to reduce the length of brake rod 45 since the thickness of the new brake shoe is greater than that of the worn shoe. The length of brake rod 45 may be reduced by applying a socket wrench to the splined socket 87 in the sleeve member 43 and manually rotating the sleeve member 43 clockwise, as viewed in Figs. 4 and 5, until the length of the brake rod 45 has been reduced the required amount.

It should be noted that, as heretofore well-known in slack adjusting mechanisms, the pawl 59 and its cam surface 65 are of such shape and size that, incidental to a release of the brakes, this cam surface engages a tooth 94 (Fig. 5) on the ratchet wheel 58 prior to the pawl 59 reaching its normal or release position corresponding to the brake release position of the brake shoe 1. After this engagement occurs, the tooth 94 is effective, as the pawl 59 continues its movement toward its release position, to rock the pawl 59 counterclockwise, as viewed in Figs. 4 and 5, about the pin 60 so that upon the pawl 59 reaching its release position the pawl tip 66 will have been moved to a position to the left of the position in which it is shown in Figs. 4 and 5, in which position the ratchet wheel 58 is free to rotate in a clockwise direction when the sleeve member 43 is manually rotated in a clockwise direction by a socket wrench applied to the splined socket 87 in the sleeve member 43.

Having now described the invention, what we claim as new and desire to secure by Letters Patent is:

1. A brake unit for applying a braking force to a wheel of a railway car truck, said unit comprising a casing immovably secured to the car truck and having a chamber therein and one wall with an opening therein, a casing section mounted on said one wall of said casing over the opening therein and having a bore registering with said opening, a piston operative in said bore and movable in opposite directions responsively to supply and release of pneumatic pressure to and from one side thereof, a lever disposed entirely within and rockably mounted on said casing, means operably connecting one end of said lever to said piston, a brake shoe, a brake head carrying said shoe, a brake hanger pivotally mounted at its one end on said casing and pivotally connected at its other end in supporting relation to said brake head, a rigid rod member movably mounted within the chamber of said casing for axial movement substantially in a straight line, one end of said rod member extending exteriorly of said casing and being pivotally connected to the brake head, and means pivotally connecting the other end of said lever to the portion of said rod member within said chamber whereby movement of the brake shoe into and out of braking contact with the tread surface of the car wheel is effected by movement of said rod member responsively to supply of pneumatic pressure to and release of pneumatic pressure from the one side of said piston respectively.

2. A brake unit as defined in claim 1, further characterized in that the rigid rod member comprises two parts, one of which is a screw member and the other of which is an internally threaded sleeve member in which the screw member is received, and further comprising means for effecting relative rotational movement of the screw member and sleeve member to vary the total length of the rigid rod member whereby to adjust the travel of the brake shoe to effect contact with the tread surface of the car wheel to a desired uniform amount, as wear of the brake shoe occurs.

3. A brake unit as defined in claim 1, further characterized in that the rigid rod member comprises two parts, one of which is a screw member and the other of which is an internally threaded sleeve member in which the screw member is received, and further including means so connecting the lever to the sleeve member as to effect rotation of the sleeve member relative to the screw member in response to rocking of said lever in a brake releasing direction subsequently to rocking of said lever through more than a certain angle in a brake applying direction as a result of shoe wear.

4. A brake unit as defined in claim 1, further characterized in that the rigid rod member comprises two parts, one of which is a non-rotative screw member connected to the brake head and the other of which is an internally threaded rotative sleeve member in which the screw member is received, and further including means operable by said lever for effecting rotational movement of said sleeve member relative to said screw-threaded member, said means being mounted on said sleeve member, and a carrier member rotatably carrying said sleeve member and said means and having a pivotal connection with said lever.

5. A brake unit defined in claim 1, further characterized in that the rigid rod member comprises two parts, one of which is a non-rotative screw member connected to the brake head and the other of which is an internally threaded rotative sleeve member in which the screw member is received, and further including an arm attached to and rockable by said lever, a resilient link pivotally connected at one end to the free end of said arm, a ratchet wheel attached to said sleeve member for rotating said sleeve member on said screw member, a pawl member, a trunnion operably connected to the opposite end of said resilient link, a pivotally mounted pawl operating lever connected at one end to said trunnion and at the other end to said pawl member, and biasing means carried by said pawl operating lever for biasing said pawl member in the direction of said ratchet wheel to effect ratcheting of said pawl member over one tooth on said ratchet wheel upon the rocking of said arm in one direction through greater than a certain angle as a result of brake shoe wear and to effect subsequent rotation of said ratchet wheel through said pawl member upon rocking of said arm in the opposite direction.

6. A brake unit as claimed in claim 1, further characterized in that said casing has a second opening in a second wall thereof, and further including a second lever pivotally mounted on said casing intermediate its ends with one arm thereof extending through said second opening into said chamber and cooperating with said lever, said second lever being effective upon manual application of force to the arm thereof external to said casing in one direction to rock said lever in a brake applying direction.

7. A brake unit for applying a braking force to a railway car wheel, said unit comprising a casing having a chamber therein and having a first and a second wall each with an opening therein and arranged at right angles to each other, a casing section mounted on said first wall of said casing over the opening therein and having a bore registering with the opening, a piston operative in said bore and movable in opposite directions responsive to supply and release of pneumatic pressure to and from one side thereof, a first lever disposed entirely within and rockably mounted on said casing, a first means operably connecting one end of said first lever to said piston, a brake shoe, a brake head carrying said shoe, a brake hanger pivotally mounted at its one end on said casing and pivotally connected at its other end in supporting relation to said brake head, a rigid rod member pivotally connected at one end to the brake head and extending through one wall of the casing into said chamber, a pair of lugs mounted on said second wall on opposite sides of the opening therein, a second manually operated lever disposed between and rockably mounted intermediate its ends on said pair of lugs, a second means operably connecting one end of said second lever to said one end of said first lever, and a third means pivotally connecting the other end of said first lever to the portion of said rigid rod member within said chamber whereby movement of the brake shoe into and out of braking contact with the thread surface of the car wheel is effected responsively either to the supply of pneumatic pressure to and release of pneumatic pressure from the one side of said piston respectively or to manual rocking of said second lever in one direction and in an opposite direction.

References Cited in the file of this patent
UNITED STATES PATENTS

| | | |
|---|---|---|
| 2,561,454 | Williams | July 24, 1951 |
| 2,812,042 | Runken | Nov. 5, 1957 |

FOREIGN PATENTS

| | | |
|---|---|---|
| 964,054 | France | Jan. 18, 1950 |